Nov. 1, 1966 T. D. READER 3,282,281

FLUID OR GATE

Filed Dec. 23, 1963

INVENTOR
TREVOR DRAKE READER

BY Thomas P. Murphy

AGENT 3,282,281
FLUID OR GATE

Trevor D. Reader, King of Prussia, Pa., assignor to Sperry Rand Corporation, New York, N.Y., a corporation of Delaware Filed Dec. 23, 1963, Ser. No. 332,544
6 Claims. (Cl. 137—81.5)

This invention relates to a fluid OR gate and more particularly to a fluid OR gate wherein the inputs are isolated from each other and from the output.

The relatively recent discovery that high energy fluid streams can be controlled by a means of low energy fluid streams without the aid of moving parts initiated a major research and development effort in this country in the fluid system field. Control of high energy fluid streams by low energy fluid streams implies amplification and so the term fluid amplifier was evolved for the fluid devices which performed this function. Other fluid devices were developed in rapid succession which because of their apparent similarities to well known electronic devices are called fluid oscillators, fluid multi-vibrators, fluid AND gates, fluid OR gates, etc.

The present invention contemplates a fluid OR gate i.e., a fluid device which provides an output when a fluid input is applied to any one or ones of its several input channels.

In this field, however, an intermingling of two or more fluid pressure signals without undesirable interference between each other and with the output signal has heretofore remained an unsolved problem.

The present invention contemplates an OR gate wherein its fluid inputs are effectively isolated from each other and from the fluid output. Thus, the fluid OR gate of the present invention overcomes the two disadvantages associated with the prior art devices as pointed out above.

Therefore, an object of the present invention is to provide a fluid OR gate wherein excessive build up of pressure in the output channel which may interfere with the fluid inputs, is prevented.

Another object of the present invention is to provide a fluid OR gate wherein the inputs are effectively isolated from each other and from the output.

Still another object of the present invention is to provide a novel combination of several OR gates of the present invention to provide a single, multiple input OR gate.

Yet another object of the present invention is to provide a device which combines three or more of the fluid OR gates of the present invention in one unit to provide a multiple input OR gate wherein each of the multiple inputs to the OR gate are effectively isolated from each other and from the output.

A further object of the present invention is to provide a multiple input fluid OR gate wherein line losses are minimized.

Other objects and many of the attendant advantages of this invention will become more apparent with the reading of the following specification in conjunction with the drawings wherein.

Figure 1:
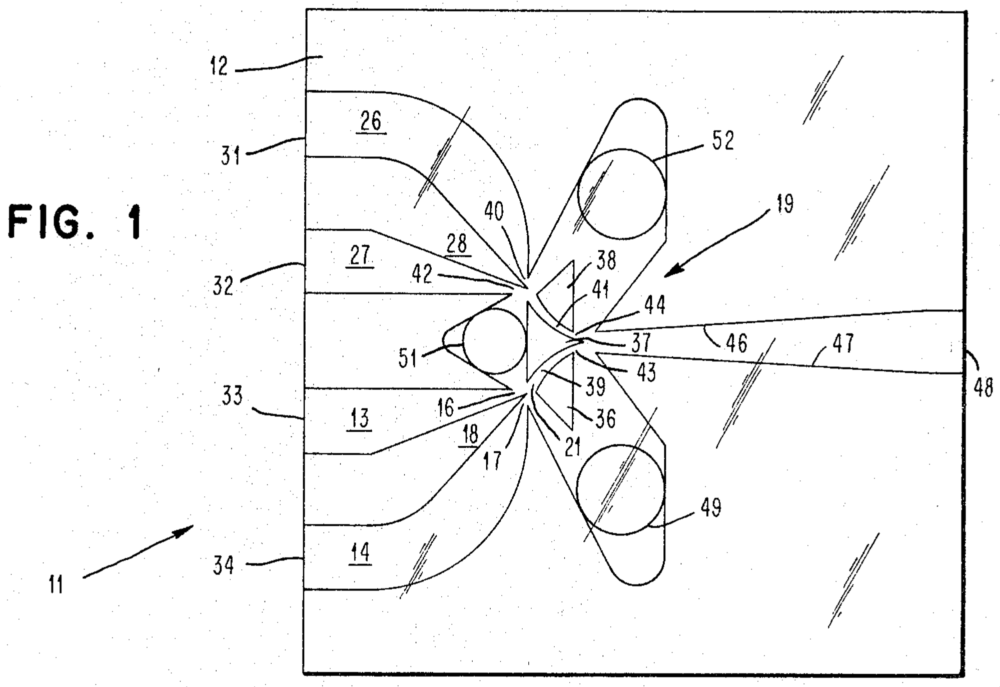
FIGURE 1 illustrates a preferred embodiment of the present invention which combines a plurality of the novel fluid OR gates of the present invention.

Referring now more particularly to FIGURE 1, there is shown a four input OR gate 11, which comprises three of the fluid OR gates of the present invention in novel combination. OR gate 11 comprises a flat plate 12 of any suitable material, such as plastic, with a series of channels cut or otherwise formed therein. In practice flat plate 12 is covered by another flat plate, not shown, of equal size to form a fluid tight system.

Figure 2:
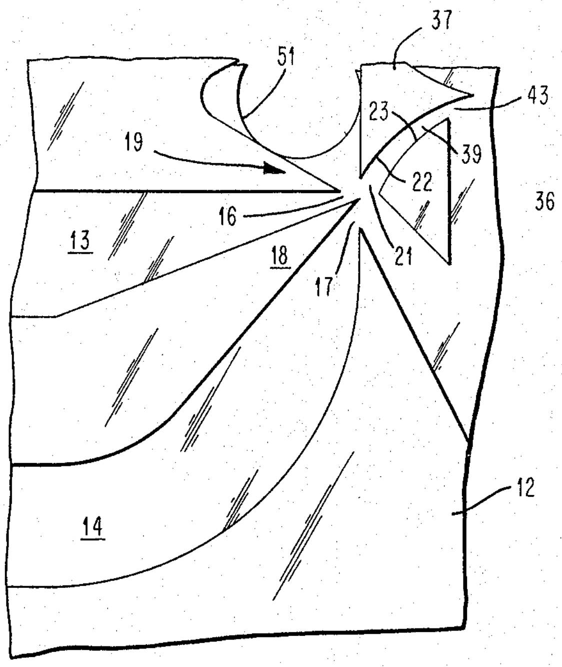
FIGURE 2 is an enlarged view of a portion of FIGURE 1 showing one of the fluid OR gates of the present invention.

FIGURE 2, which is an enlarged view of one of the fluid OR gates shown in FIGURE 1, is discussed first. Referring to FIGURE 2, there are shown two channels 13 and 14 formed in plate 12. These channels converge and represent one input channel to another two input OR gate, as will be seen. The exit orifices 16 and 17 of channels 13 and 14, respectively, are separated from each other by a wedge 18 which extends beyond the orifices and into buffer chamber 19. A channel 39 is so positioned relative to chambers 13 and 14 and wedge 18 to collect the high velocity fluid which issues from either channel 13 or 14 or both simultaneously when any input fluid signals are applied to inputs 13 or 14. The channel 39 is formed in housing 12 in a manner to be discussed more fully in connection with FIGURE 1.

The fluid OR gate of FIGURE 2 which illustrates one of the OR gates of the present invention, is opened to low pressure dumps on each side of wedge 18 in a manner to be more fully described in connection with FIGURE 1. Such an arrangement prevents undesirable build up of excessive fluid from channels 13 and 14 in channel 39. Thus, the fluid outputs of channels 13 and 14 are separated by wedge 18 from each other while the opening of the OR gate to low pressure dumps or the atmosphere on either side of wedge 18 isolates the output channel 39 from the two OR inputs at channels 13 and 14.

Referring now more particularly to FIGURE 1, there is shown three of the fluid OR gates of the type described in connection with FIGURE 2. These three OR gates are combined in a single unit to provide a four input OR gate having input channels 13, 14, 26, 27 formed in plate 12.

Each of channels 26, 27, 13, and 14 has openings 31, 32, 33 and 34, respectively, for receiving fluid inputs. Channels 13 and 14 converge up stream to form orifices 16 and 17, respectively, which emit the fluid as high energy jet streams when fluid input signals are applied to either channel 13 or 14. Wedge 18, which extends somewhat beyond orifices 16 and 17 into chamber 19, isolates the fluid outputs of channels 13 and 14 from each other. Similarly, channels 26 and 27 converge up stream to form orifices 40 and 42, respectively, which emit the fluid as high energy jet streams into chamber 19 when an input fluid signal is applied to either channel 26 or 27. Wedge 28 also extends into chamber 19 and somewhat beyond orifices 40 and 42 and, in so doing, isolates the fluid outputs of channels 26 and 27 from each other. The combination of the channels 26, 27, the wedge 28, the converging orifices 40 and 42, all similar to elements illustrated in FIGURE 2, may be considered as another or second OR gate involving the present invention.

Centrally located within the chamber 19 is a triangular shaped element 37 which may be integral or otherwise attached to plate 12. Located on each side of element 37 are pie shaped elements 36 and 38. Elements 36 and 37 are so configured as to form converging channel 39. Likewise, elements 38 and 37 form converging channel 41.

Channel 39 is so positioned relative to wedge 18 as to collect any high velocity fluid emitted from either channel 13 or 14 or both of them simultaneously. Similarly, channel 41 is so positioned relative to wedge 28 as to collect any high velocity fluid emitted from either channel 26 or 27 or both of them simultaneously.

Elements 36, 37, and 38 form another or third fluid OR gate involving the present invention. Channel 39 may receive one or two inputs depending on whether one or both of channels 13 and 14 have inputs applied thereto. Channel 41 may receive one or two inputs depending on whether one or both of channels 26 and 27 have inputs applied thereto. Each of channels 39 and 41 converge to form orifices 43 and 44, respectively. In a manner similar to wedges 18 and 28, element 37 forms a wedge which extends somewhat beyond orifices 43 and 44 to thereby isolate the outputs of these orifices from each other.

Receiver channel 46 opens to chamber 19 and is so positioned relative to the wedge portion of element 37 as to receive either one or both of the outputs from orifices 43 and 44. Channel 46 is enlarged up stream to form a diffusing area 47 for the purpose of minimizing line losses while the fluid is being transmitted to a load via opening 48, at which time it may be converted into a high energy jet stream.

Chamber 19 is disposed to communicate with a low pressure dump, such as the atmosphere, via openings 49, 51, and 52 which extend perpendicularly through plate 12. Opening 51 is located within the area defined by orifices 16 and 42 and element 37. Openings 49 and 52 are located within chamber 19 on either side of element 37 substantially as shown in the drawing.

Openings or bleed areas 49 and 51 permit surplus fluid from orifices 16 and 17 to be discharged into a common low pressure dump e.g., the atmosphere, thereby preventing unwanted pressure build up caused by insufficient flow in channel 39, by back loading or by any other condition.

Openings or bleed areas 51 and 52 serve to prevent unwanted pressure build up in channel 41 from orifices 40 and 42. In like manner, openings or bleed areas 49 and 52 are connected to dumps or the atmosphere to relieve pressure build up at the orifices 43 and 44 and receiver channel 46.

Thus, openings 49 and 51 isolate the output pressure of channel 39 from the inputs of channels 13 and 14; openings 51 and 52 isolate the output pressure of channel 41 from the inputs of channels 26 and 27; openings 49 and 52 isolate the output pressure of channel receiver 46 from the inputs of channels 39 and 41.

Thus in operation, when a fluid input is applied to any one or any combination of channels 26, 27, 13 and 14, all of the inputs are effectively isolated from one another. Also, the output at opening 48 of receiver channel 46 is completely free from interference from any of the inputs.

Figure 3:
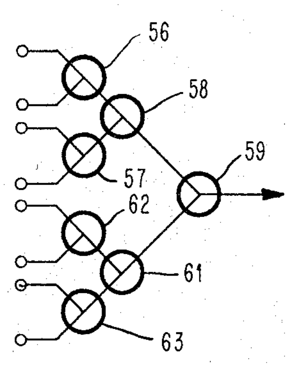
FIGURE 3 is a diagrammatic representation of another embodiment of the present invention.

It is possible to combine almost any number of the fluid OR gates of the present invention to provide a multi-input OR gate in a single unit. For example, referring to FIGURE 3, there is illustrated diagrammatically the combination of seven of the two input OR gates of the present invention to form an eight input OR gate. In this configuration two input OR gates 56 and 57 each provides an input to two input OR gate 58 which, in turn, provides a single input to two input OR gate 59. Similarly, two input OR gate 61 which may receive an input from either or both of two input OR gates 62 and 63 provides the second input to two input OR gate 59. Suitable connections to dumps or the atmosphere are provided in a manner described above. Thus, when any one of OR gates 56, 57, 62 or 63 or any combination thereof has an input, OR gate 59 provides an output, which output is unaffected by undesirable pressure build up in its output channel due to surplus fluid from either OR gate 58 or 61.

The outputs of OR gates 58 and 61 in turn are unaffected by surplus air or fluid from any of OR gates 56, 57, 62, or 63. Similarly, due to the construction of the fluid OR gate of the present invention each of the outputs from all of the OR gates shown in FIGURE 3 with the exception of OR gate 59 where it is not needed are isolated from one another. The isolation of the output of OR gate 59 from the inputs to OR gates 56, 57, 62, and 63 is accomplished by means of openings (not shown in the diagrammatic illustration) to a common low pressure dump on either side of the outputs of all the OR gates.

Obviously, many modifications and variations of the above invention are possible in the light of the above disclosure and the various embodiments utilized to illustrate the present invention should not be understood as limiting the scope of the present invention beyond the limitations imposed in the following claims.

The embodiments of the invention in which an exclusive property or privilege is claimed are defined as follows:

1. A fluid OR gate comprising in combination; chamber means, first channel means terminating in an orifice in said chamber means, second channel means terminating in an orifice in said chamber means, said first and second channel means being in substantially adjacent relationship, wedge means disposed between said first and second channel means extending somewhat beyond said orifices into said chamber means for separating said orifices from each other for isolating the inputs to said first and second channel means from each other, output channel means having an opening in said chamber means disposed relative to said orifices to receive the fluid outputs therefrom, opening means in said chamber means on each side of said output channel means connecting said chamber means to the atmosphere whereby fluid pressure build-up within said output channel means due to excess fluid is prevented.

2. A fluid OR gate, comprising in combination: chamber means, a first plurality of pairs of input channels, each of said input channels terminating in an orifice within said chamber means, said orifices of each pair of said input channels directing the outputs therefrom into one jet stream at a first point downstream therefrom, a receiver channel for each pair of said input channels disposed within said chamber means having an opening at said first point relative to said orifices for receiving said jet streams from each pair of said input channels, each of said receiver channels terminating in an orifice, said orifices of each pair of said receiver channels directing the outputs therefrom into one jet stream at a second point downstream therefrom, an output channel for each pair of said receiver channels having an opening in said chamber means at said second point relative to said orifices for receiving said jet streams from each pair of said receiver channels.

3. A fluid OR gate, comprising in combination; chamber means, a first plurality of input channels, each of said input channels terminating in an orifice within said chamber means, means associated with each of said input channels isolating said orifices from each other, said orifices of each pair of said input channels directing the outputs therefrom into one jet stream at a first point downstream therefrom, a receiver channel for each pair of said input channels disposed within said chamber means having an opening at said first point relative to said orifices for receiving said jet streams from each pair of said input channels, each of said receiver channels terminating in an orifice, means associated with each of said receiver channels isolating said orifices from each other, said orifices of each pair of said receiver channels directing the outputs therefrom into one jet stream at a second point downstream therefrom, an output channel for each pair of said receiver channels having an opening in said chamber means at said second point relative to said orifices for receiving said jet streams from each pair of said receiver channels.

4. A fluid OR gate, comprising in combination; chamber means, a first plurality of input channels, each of said input channels terminating in an orifice within said chamber means, said orifices of each pair of said input channels directing the outputs therefrom into one jet stream at a first point downstream therefrom, a receiver channel for each pair of said input channels disposed within said chamber means having an opening at said first point relative to said orifices for receiving said jet streams from each pair of said input channels, each of said receiver channels terminating in an orifice, said orifices of each pair of said receiver channels directing the outputs therefrom into one jet stream at a second point downstream therefrom, an output channel for each pair of said receiver channels having an opening in said chamber means at said second point relative to said orifices for receiving said jet streams from each pair of said receiver channels, opening means in said chamber means on each side of said openings of said receiver channels and said output channels communicating with a low pressure area whereby unwanted pressure build-up within said receiver and output channels is prevented.

5. A fluid OR gate, comprising in combination; chamber means, a first plurality of input channels, each of said input channels terminating in an orifice within said chamber means, means associated with each of said input channels isolating said orifices from each other, said orifices of each pair of said input channels directing the outputs therefrom into one jet stream at a first point downstream therefrom, a receiver channel for each pair of said input channels disposed within said chamber means having an opening at said first point relative to said orifices for receiving said jet streams from each pair of said input channels, each of said receiver channels terminating in an orifice, means associated with each of said receiver channels isolating said orifices from each other, said orifices of each pair of said receiver channels directing the outputs therefrom into one jet stream at a second point downstream therefrom, an output channel for each pair of said receiver channels having an opening in said chamber means at said second point relative to said orifices for receiving said jet streams from each pair of said receiver channels, opening means in said chamber means on each side of said openings of said receiver channels and said output channels communicating with a low pressure area whereby unwanted pressure build-up within said receiver and output channels is prevented.

6. A fluid OR gate, comprising in combination; chamber means, a first input channel terminating in an orifice within said chamber means, a second input channel terminating in an orifice within said chamber means, means disposed between said first and second input channels isolating said orifices from each other, a third input channel terminating in an orifice within said chamber means, a fourth input channel terminating in an orifice within said chamber means, means disposed between said third and fourth input channels isolating said orifices from each other, a first receiver channel having an opening relative to said orifices of said first and second input channels for receiving the outputs therefrom, a second receiver channel having an opening relative to said orifices of said third and fourth input channels for receiving the outputs therefrom, each of said first and second receiver channels terminating in an orifice adjacent to each other, means disposed between said first and second receiver channels isolating said orifices from each other, an output channel having an opening in said chamber means disposed relative to said orifices of said first and second receiver channels for receiving the outputs therefrom, opening means in said chamber means on each side of said first and second receiver channels and said output channel communicating with a low pressure area whereby unwanted pressure build-up within said first and second receiver channels and said output channel is prevented.

References Cited by the Examiner

UNITED STATES PATENTS 3,107,850 10/1963 Warren et al. ----- 137—81.5 X

OTHER REFERENCES

"Binary Full Adder," A. E. Mitchell, I.B.M. Technical Disclosure Bulletin, September 1963, vol. 6, No. 4, pp. 93, 94.

"Fluid Logic Devices and Circuits," A. E. Mitchell et al., Transactions of The Society of Instrument Technology, Feb. 26, 1963, page 12, Fig. 11*b*.

M. CARY NELSON, *Primary Examiner*.

S. SCOTT, *Assistant Examiner*.